US011938477B2

(12) United States Patent
Nwachukwu et al.

(10) Patent No.: US 11,938,477 B2
(45) Date of Patent: Mar. 26, 2024

(54) # MICROFLUIDIC CARTRIDGE COMPRISING SILICONE PRESSURE-SENSITIVE ADHESIVE

(71) Applicant: The Procter & Gamble Company, Cincinnati, OH (US)

(72) Inventors: Chisomaga Ugochi Nwachukwu, Cincinnati, OH (US); Judith Ann Hollingshead, Batavia, OH (US); Paul William Dryer, Lexington, KY (US); David Christopher Graham, Lexington, KY (US); Sean Terrence Weaver, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 254 days.

(21) Appl. No.: 16/924,266

(22) Filed: Jul. 9, 2020

(65) Prior Publication Data

US 2021/0016279 A1 Jan. 21, 2021

Related U.S. Application Data

(60) Provisional application No. 62/875,112, filed on Jul. 17, 2019.

(51) Int. Cl.
*B01L 3/00* (2006.01)

(52) U.S. Cl.
CPC ... *B01L 3/502715* (2013.01); *B01L 2300/041* (2013.01); *B01L 2300/047* (2013.01);
(Continued)

(58) Field of Classification Search
CPC .. B01L 3/502715; B01L 3/5027; B01L 3/502; B01L 3/50; B01L 2300/041;
(Continued)

(56) References Cited

U.S. PATENT DOCUMENTS 6,121,368 A 9/2000 Heying et al.
6,361,146 B1 * 3/2002 Saldanha Singh ......... C09J 5/00 347/50

(Continued)

FOREIGN PATENT DOCUMENTS

JP H0584925 A 4/1993
JP 2000047244 A 2/2000

(Continued)

OTHER PUBLICATIONS

International Search Report and Written Opinion; Application Ser. No. PCT/US2020/070272; dated Oct. 15, 2020, 11 pages.

*Primary Examiner* — Christine T Mui
(74) *Attorney, Agent, or Firm* — Carolyn S. Powell; George H. Leal

(57) ABSTRACT

A microfluidic cartridge is provided. The microfluidic cartridge has an interior and an exterior. The microfluidic cartridge includes a reservoir disposed in the interior of the microfluidic cartridge and configured to contain a fluid composition. The microfluidic cartridge includes an electric circuit disposed on the exterior of the microfluidic cartridge. The electric circuit comprises a first end portion having electrical contacts and a second end portion opposing the first end portion. The microfluidic cartridge includes a microfluidic die disposed on the exterior of the microfluidic cartridge, wherein the microfluidic die is electrically connected with the second end portion of the electric circuit and in fluid communication with the reservoir. A silicone pressure-sensitive adhesive is used to join the electric circuit with the exterior of the microfluidic cartridge.

11 Claims, 13 Drawing Sheets

(52) U.S. Cl.
CPC ... *B01L 2300/06* (2013.01); *B01L 2300/0809* (2013.01); *B01L 2300/0877* (2013.01); *B01L 2300/12* (2013.01)

(58) Field of Classification Search
CPC ........... B01L 2300/047; B01L 2300/06; B01L 2300/0809; B01L 2300/0877; B01L 2300/12
USPC ........................................... 422/502, 500, 50
See application file for complete search history.

(56) References Cited

U.S. PATENT DOCUMENTS

| | | | | |
|---|---|---|---|---|
| 6,409,312 | B1 | 6/2002 | Mrvos | |
| 6,834,937 | B2 | 12/2004 | Killmeier | |
| 7,438,392 | B2 | 10/2008 | Vaideeswaran | |
| 7,531,047 | B1 | 5/2009 | Dryer | |
| 7,654,637 | B2 | 2/2010 | Weaver | |
| 7,871,150 | B2 | 1/2011 | Imken et al. | |
| 8,109,608 | B2 | 2/2012 | Fannin | |
| 8,173,031 | B2 | 5/2012 | Weaver | |
| 8,292,402 | B2 | 10/2012 | Weaver | |
| 9,211,980 | B1 * | 12/2015 | Gruenbacher ......... | B41J 2/1433 |
| 10,040,090 | B2 | 8/2018 | Gruenbacher et al. | |
| 10,307,783 | B1 | 6/2019 | Gruenbacher et al. | |
| 2005/0231551 | A1 * | 10/2005 | Gibson .................. | B41J 2/1623 347/45 |
| 2007/0236542 | A1 | 10/2007 | Graham | |
| 2011/0014354 | A1 | 1/2011 | Graham | |
| 2012/0098885 | A1 | 4/2012 | Harada et al. | |
| 2014/0078229 | A1 | 3/2014 | Jackson | |
| 2015/0265739 | A1 | 9/2015 | Gruenbacher | |
| 2018/0140733 | A1 | 5/2018 | Webb | |
| 2018/0290156 | A1 | 10/2018 | Gruenbacher et al. | |

FOREIGN PATENT DOCUMENTS

| | | | |
|---|---|---|---|
| JP | 2005224504 | A | 8/2005 |
| JP | 2015097695 | A | 5/2015 |
| WO | 2013142847 | A1 | 9/2013 |

* cited by examiner

MICROFLUIDIC CARTRIDGE COMPRISING SILICONE PRESSURE-SENSITIVE ADHESIVE

FIELD

The present disclosure is directed to a microfluidic cartridge, and, more particularly, is directed to a microfluidic cartridge comprising a silicone pressure-sensitive adhesive.

BACKGROUND

Microfluidic cartridges exist for delivering compositions, including fluid compositions comprising perfume mixtures, either onto a surface or into the air using a microfluidic die. Microfluidic cartridges may contain a fluid composition and a microfluidic die having one or more nozzles for dispensing the fluid composition. The microfluidic cartridges may be releasably connectable with a housing of a microfluidic delivery device. In microfluidic cartridges, particularly as they have been used with fluid compositions that are free of perfume compositions, adhesive may be used to attach certain components to the microfluidic cartridge, including the electric circuit. However, fluid compositions comprising perfume mixtures can react with materials such as adhesive, which can potentially lead to electrical, mechanical, and chemical issues.

Thus, it would be beneficial to provide a microfluidic cartridge that is chemically compatible with a fluid composition comprising a perfume mixture.

SUMMARY

"Combinations:"

A. A microfluidic cartridge comprising:

an interior;

an exterior;

a reservoir disposed in the interior of the microfluidic cartridge and configured to contain a fluid composition comprising a perfume mixture;

an electric circuit disposed on the exterior of the microfluidic cartridge, the electric circuit comprises a first end portion having electrical contacts and a second end portion opposing the first end portion;

a microfluidic die disposed on the exterior of the microfluidic cartridge, wherein the microfluidic die is electrically connected with the second end portion of the electric circuit and in fluid communication with the reservoir; and a silicone pressure-sensitive adhesive joining the electric circuit with the exterior of the microfluidic cartridge.

B. The microfluidic cartridge of Paragraph A, wherein the first end portion of the electric circuit is disposed on a first face of the exterior and the second end portion of the electric circuit is disposed on a second face of the exterior, and wherein the microfluidic die is disposed on the second face.

C. The microfluidic cartridge of Paragraph B further comprising a sticker, wherein the sticker comprises a silicone pressure-sensitive adhesive.

D. The microfluidic cartridge of Paragraph C, wherein the sticker covers the microfluidic die.

E. The microfluidic cartridge of any of Paragraphs A through D, wherein the microfluidic die comprises a semiconductor substrate comprising a plurality of thermal resistors, a fluid flow substrate comprising a fluid supply channel and one or more fluid chambers, wherein each fluid chamber is associated with one of the plurality of thermal resistors, and a nozzle plate comprising one or more nozzles, wherein each nozzle is in fluid communication with a fluid chamber.

F. The microfluidic cartridge of any of Paragraphs A through E, wherein the fluid composition comprises at least 70 wt. % of a perfume mixture, based on the total weight of the fluid composition.

G. A microfluidic cartridge comprising:

an interior;

an exterior;

a reservoir disposed in the interior of the microfluidic cartridge and configured to contain a fluid composition comprising a perfume mixture;

a lid enclosing the reservoir;

a lid sticker disposed on the exterior surface of the lid, the lid sticker comprising a silicone pressure-sensitive adhesive;

an electric circuit disposed on the exterior of the microfluidic cartridge, the electric circuit comprises a first end portion having electrical contacts and a second end portion opposing the first end portion;

a microfluidic die disposed on the exterior of the microfluidic cartridge, wherein the microfluidic die is electrically connected with the second end portion of the electric circuit and in fluid communication with the reservoir; and H. The microfluidic cartridge of Paragraph G, wherein the first end portion of the electric circuit is disposed on a first face of the exterior and the second end portion of the electric circuit is disposed on a second face of the exterior, and wherein the microfluidic die is disposed on the second face.

I. The microfluidic cartridge of Paragraph G or Paragraph H further comprising a sticker, wherein the sticker comprises a silicone pressure-sensitive adhesive.

J. The microfluidic cartridge of Paragraph I, wherein the sticker covers the microfluidic die.

K. The microfluidic cartridge of any of Paragraphs G through J, wherein the microfluidic die comprises a semiconductor substrate comprising a plurality of thermal resistors, a fluid flow substrate comprising a fluid supply channel and one or more fluid chambers, wherein each fluid chamber is associated with one of the plurality of thermal resistors, and a nozzle plate comprising one or more nozzles, wherein each nozzle is in fluid communication with a fluid chamber.

L. The microfluidic cartridge of any of Paragraphs G through J, wherein the fluid composition comprises at least 70 wt. % of a perfume mixture, based on the total weight of the fluid composition.

DETAILED DESCRIPTION

Figure 1:
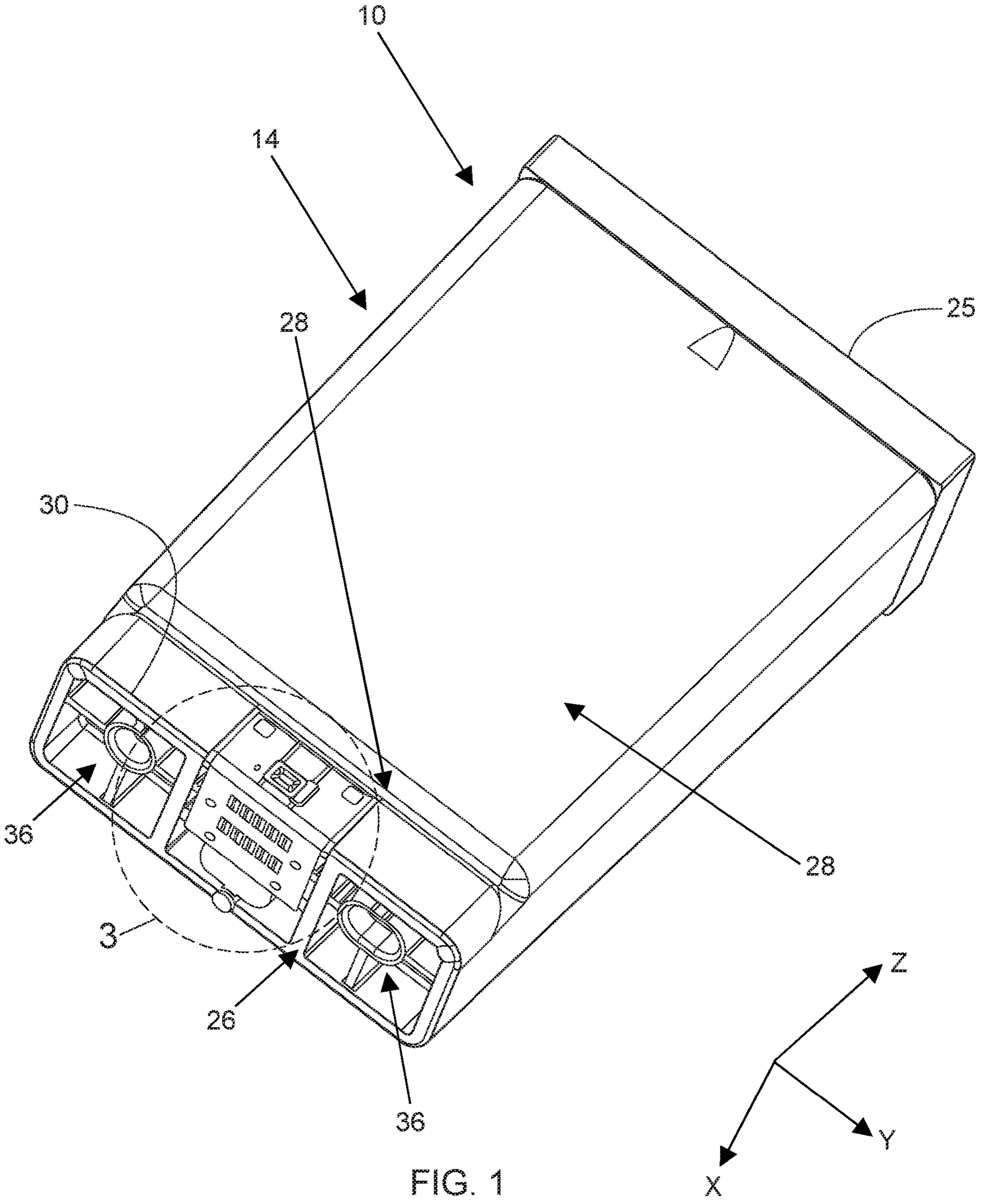
FIG. 1 is a perspective view of a microfluidic cartridge with an electric circuit and microfluidic die.

While the below description describes a microfluidic cartridge and a microfluidic delivery device, both having various components, it is to be understood that the microfluidic cartridge and microfluidic delivery device are not limited to the construction and arrangement set forth in the following description or illustrated in the drawings. The microfluidic cartridge, sticker, and method of installing the microfluidic cartridge into a housing of a microfluidic delivery device are applicable to other configurations or may be practiced or carried out in various ways. For example, the sticker may be used with various microfluidic cartridges or other housing configurations for delivering a fluid composition into the air or onto a surface.

Throughout the present disclosure, reference is made to cartesian coordinate system including an X-axis, Y-axis, and a Z-axis that extend from a common origin and that are mutually orthogonal. Reference may also be made to an X-direction, a Y-direction, and a Z-direction that run parallel with the respective axis. The microfluidic cartridge is configured to be connected with a microfluidic delivery device in a Z-direction.

The present disclosure is directed to a microfluidic cartridge. The microfluidic cartridge is configured to be releasably connectable with a housing of a microfluidic delivery device. The microfluidic cartridge may include an interior and an exterior. The interior of the microfluidic cartridge may comprise a reservoir for containing a liquid composition. The reservoir may include a fluid channel extending from reservoir and terminating at a fluid opening that is in fluid communication with a microfluidic die disposed on the exterior of the microfluidic cartridge. The microfluidic cartridge may include an electric circuit that electrically connects the microfluidic die with a power source and a controller. The electric circuit may be joined with the exterior of the microfluidic cartridge using a silicone pressure-sensitive adhesive. It has been found that a silicone pressure-sensitive adhesive, unlike other common adhesives, is chemically compatible with a fluid composition comprising a perfume mixture, while also providing the adhesion strength to join the electric circuit with the exterior of the microfluidic cartridge.

The microfluidic delivery device may comprise a housing and a power source. The housing may include a receptacle having an opening for receiving the microfluidic cartridge. The receptacle may receive a portion of the microfluidic cartridge or the microfluidic cartridge may be completely disposed within the receptacle. The receptacle of the housing may include electrical contacts that are in electrical connect with a power source and are configured to electrically connect with the electrical contacts of the microfluidic cartridge. The receptacle may include one or more housing connectors that are configured to connect with the cartridge connectors to enable a robust electrical connection between the housing and the microfluidic cartridge.

Microfluidic Cartridge

Figure 2:
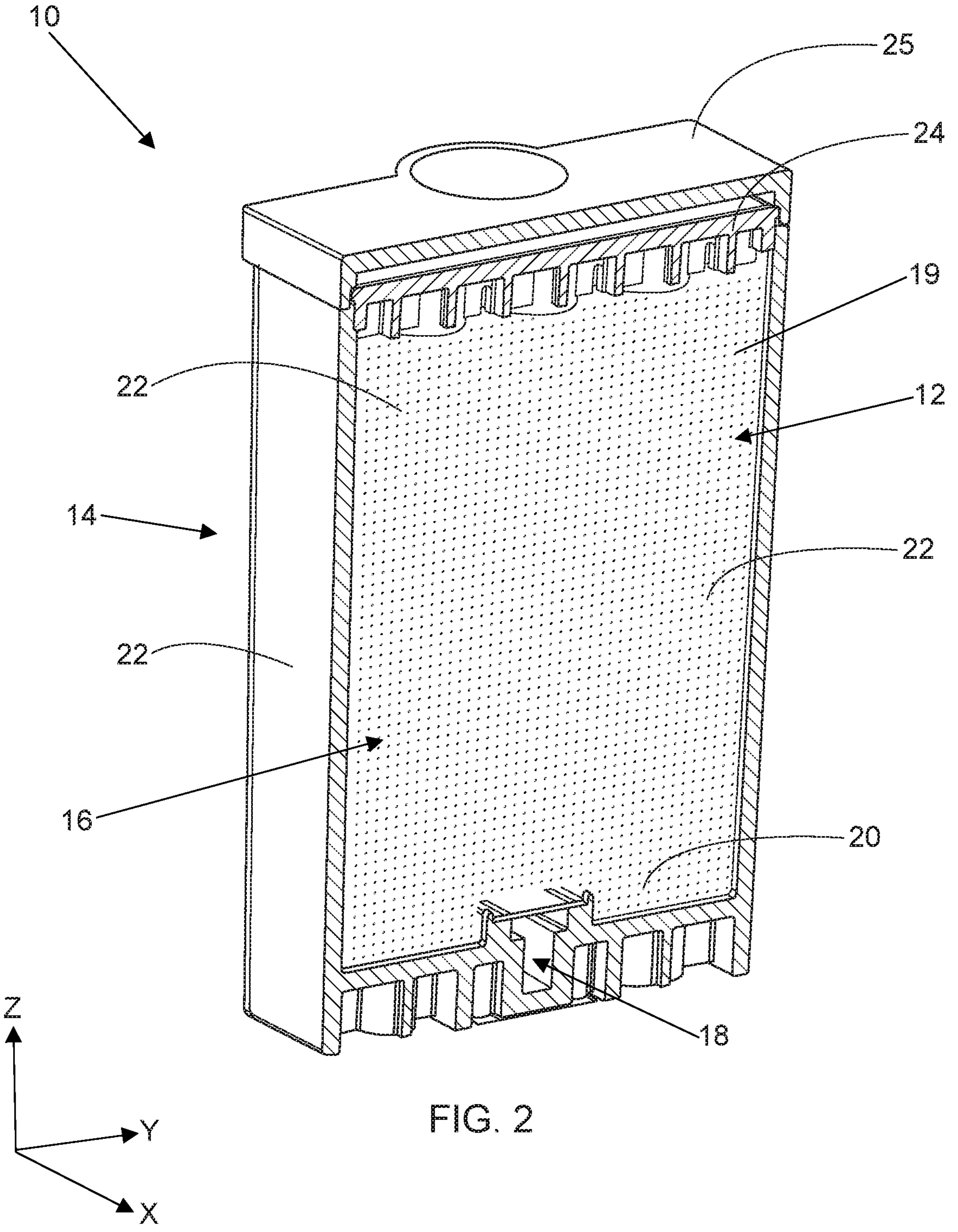
FIG. 2 is a sectional view of a microfluidic cartridge.

With reference to FIGS. 1 and 2, a microfluidic cartridge 10 comprises an interior 12 and an exterior 14. The interior 12 of the microfluidic cartridge 10 comprises a reservoir 16 and one or more fluid channels 18 that are in fluid communication with the microfluidic die 51. The reservoir 16 may be formed from a base wall 20 or a plurality of surfaces forming a base wall 20 and one or more side walls 22. The reservoir 16 may be enclosed by a lid 24 of the microfluidic cartridge 10. The fluid channel 18 extends from reservoir 16 to the exterior 14 of the microfluidic cartridge 10 at the fluid opening. The reservoir may include an air vent. The lid 24 may be integral with the reservoir 16 or may be constructed as a separate element that is connected with the reservoir 16.

Figure 14:
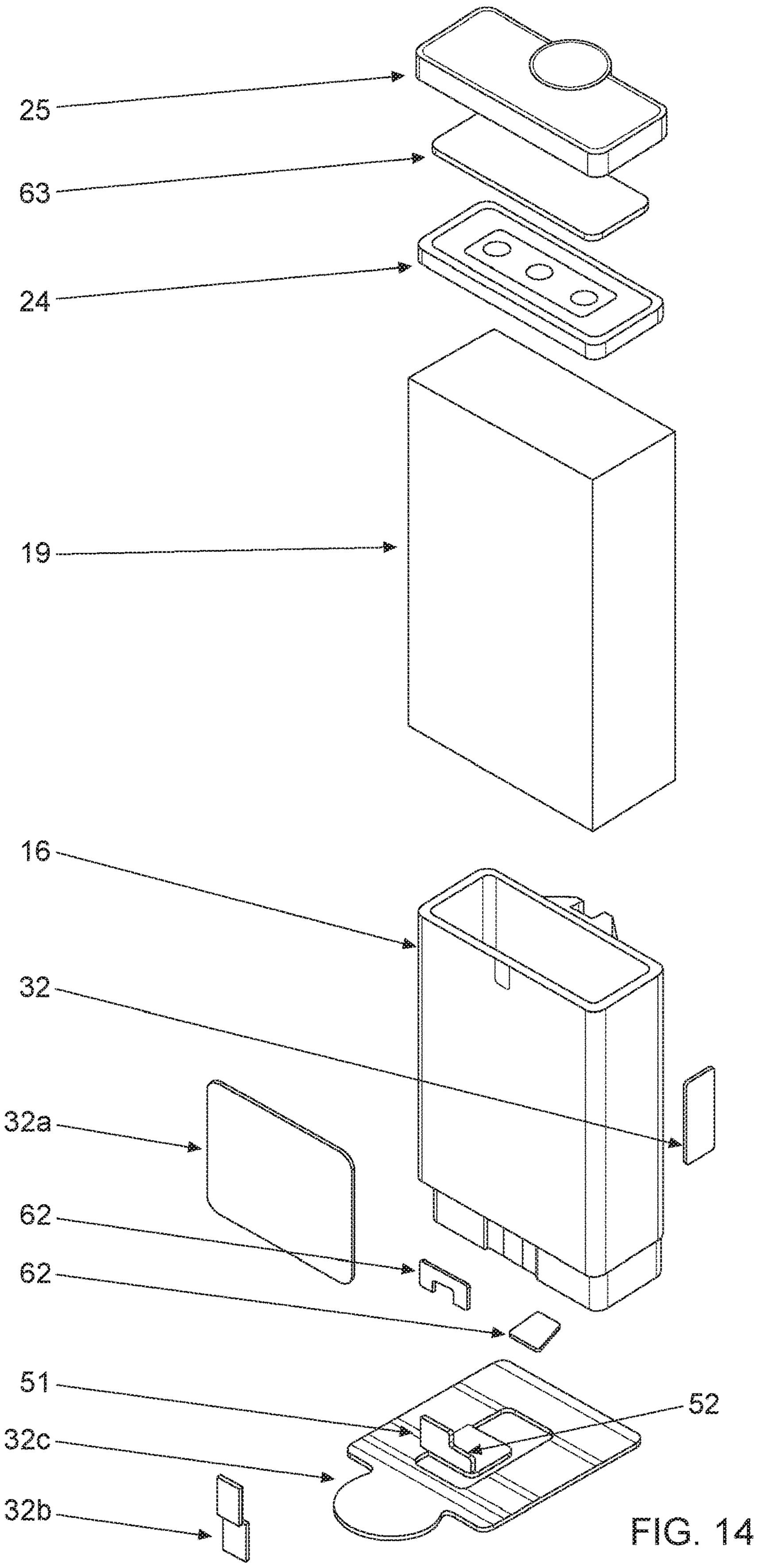
FIG. 14 is an exploded view of a microfluidic cartridge.

With reference to FIG. 14, the exterior 14 of the lid 24 may be at least partially covered with a lid sticker 63. The lid sticker 63 may seal any apertures in the lid 24, including apertures for vacuum filling, fluid composition filling, and/or any air vents present in the lid 24. With reference to FIGS. 2 and 14, the lid 24 and lid sticker 63 may be at least partially covered by a lid cover 25.

The reservoir 16 of the microfluidic cartridge 10 may contain from about 5 mL to about 50 mL of fluid composition, alternatively from about 10 mL to about 30 mL of fluid composition, alternatively from about 15 mL to about 20 mL of fluid composition. The reservoir 16 can be made of any suitable material for containing a fluid composition. Suitable materials for the containers include, but are not limited to, plastic, metal, ceramic, composite, and the like. A microfluidic cartridge may be configured to have multiple reservoirs, each containing the same or a different composition. The microfluidic delivery device may utilize one or more microfluidic cartridges, each containing a separate reservoir.

The reservoir 16 may also contain a porous material 19 such as a sponge that creates a back pressure to prevent the fluid composition from leaking from the microfluidic die when the microfluidic die is not in operation. The fluid composition may travel through the porous material and to the microfluidic die through gravity force and/or capillary force acting on the fluid composition. The porous material may comprise a metal or fabric mesh, open-cell polymer foam, or fibrous polyethylene terephthalate, polypropylene, or bi-components of fibers or porous wick, that contain multiple interconnected open cells that form fluid passages. The sponge may include a polyurethane foam. The reservoir 16 may also include a back pressure device, such as a spring or bladder, in addition to or in place of a porous material.

With reference to FIG. 1, the exterior 14 of the microfluidic cartridge 10 is made up of two, three, or more faces. Each face is bounded by one or more edges. Two faces are connected along an edge. Each face may be flat, substantially flat, or contoured in various ways. The faces may connect to form various shapes, such as a cube, cylinder, cone, tetrahedron, triangular prism, cuboid, etc. The microfluidic cartridge may be comprised of various materials, including plastic, metal, glass, ceramic, wood, composite, and combinations thereof. Different elements of the microfluidic cartridge may be comprised of the same or different materials.

The microfluidic cartridge 10 may comprise at least a first face 26 and a second face 28 joined along an edge 30. For example, the first face 26 may be a bottom face and the second face 28 may be a side face.

In a microfluidic cartridge 10 that is substantially cube-shaped, the microfluidic cartridge 10 may include a top face, a bottom face that opposes the top face, and four side faces extending between the top and bottom faces. Each joining face may be connected along an edge. In a cylindrical-shaped microfluidic cartridge, for example, the microfluidic cartridge may include a top face, a bottom face opposing the top face, and a single curved side face extending between the top and bottom faces.

Figure 3:
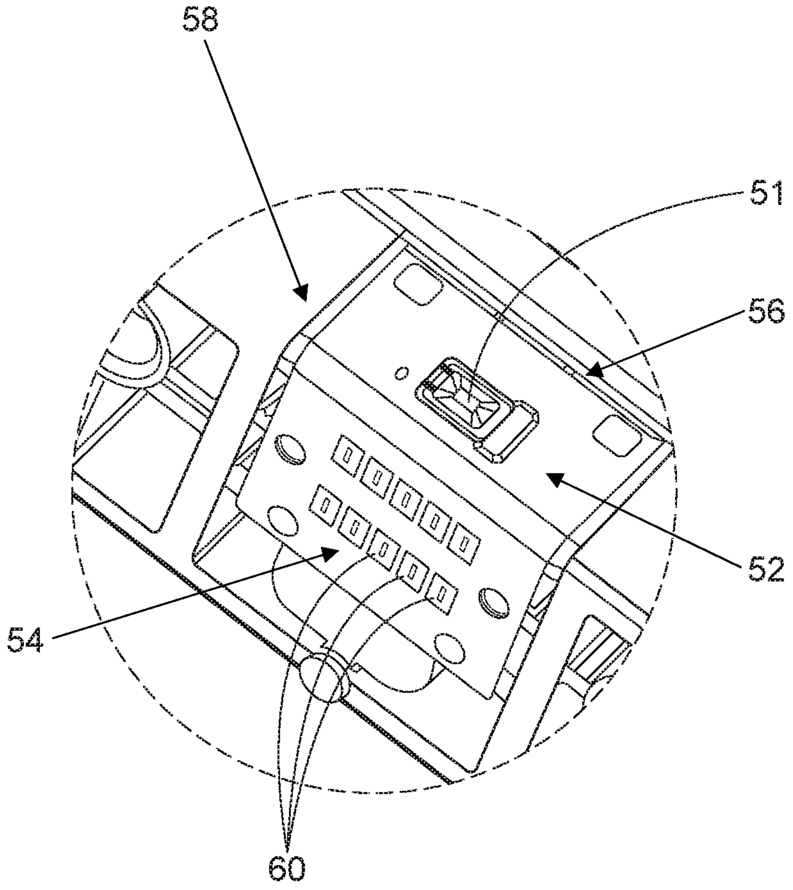
FIG. 3 is an exploded view of an electric circuit and microfluidic die on a microfluidic cartridge.

With reference to FIGS. 1-3, the fluid channel 18 of the microfluidic cartridge 10 may extend to a fluid opening that may be disposed in the second face 28 of the microfluidic cartridge 10. The microfluidic cartridge 10 may include a microfluidic die 51 disposed on the second face 28. The fluid channel 18 may open up to the microfluidic die 51 such that the fluid channel 18 is in fluid communication with the microfluidic die 51.

The primary components of a microfluidic die are a semiconductor substrate, a flow feature layer, and a nozzle plate layer. The flow feature layer and the nozzle plate layer may be formed from two separate layers or one continuous layer. The semiconductor substrate is preferably made of silicon and contains various passivation layers, conductive metal layers, resistive layers, insulative layers and protective layers deposited on a device surface thereof. Fluid ejection actuators in the semiconductor substrate generate rapid pressure impulses to eject the fluid composition from the nozzles. The rapid pressure impulses may be generated by piezoelectric device that vibrates at a high frequency (e.g., micro mechanical actuation) or by a heater resistor that cause volatilization of a portion of a fluid composition within the fluid composition through rapid heating cycles (e.g., micro thermal nucleation). For thermal actuators, individual heater resistors are defined in the resistive layers and each heater resistor corresponds to a nozzle in the nozzle plate for heating and ejecting the fluid composition from the nozzle.

Figure 4:
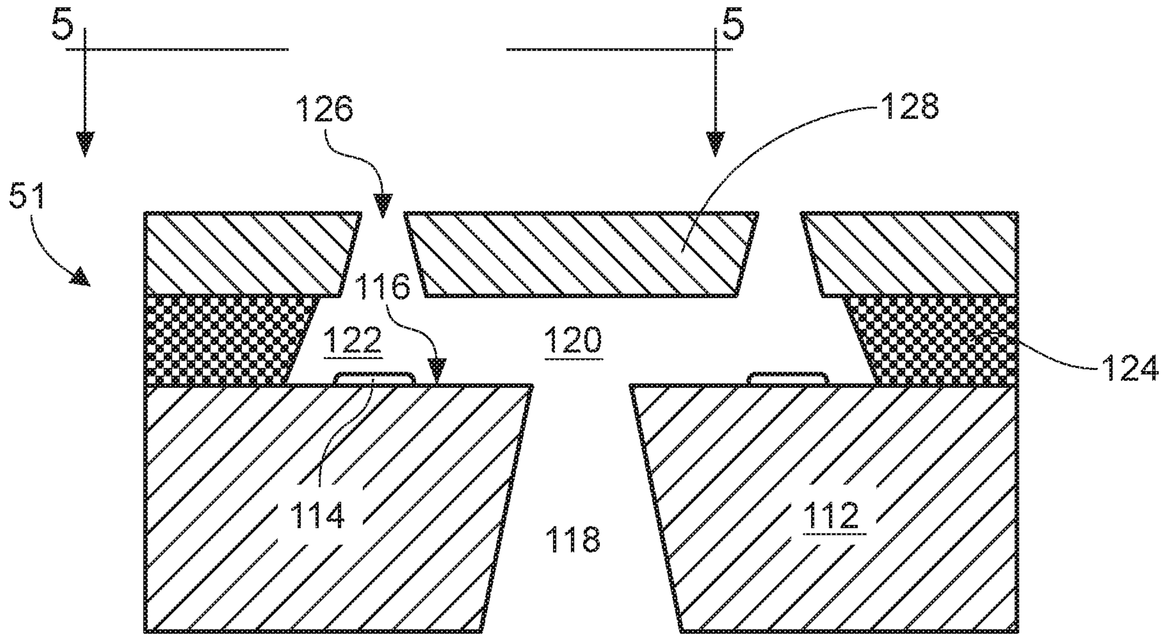
FIG. 4 is a sectional view of a microfluidic die.
Figure 5:
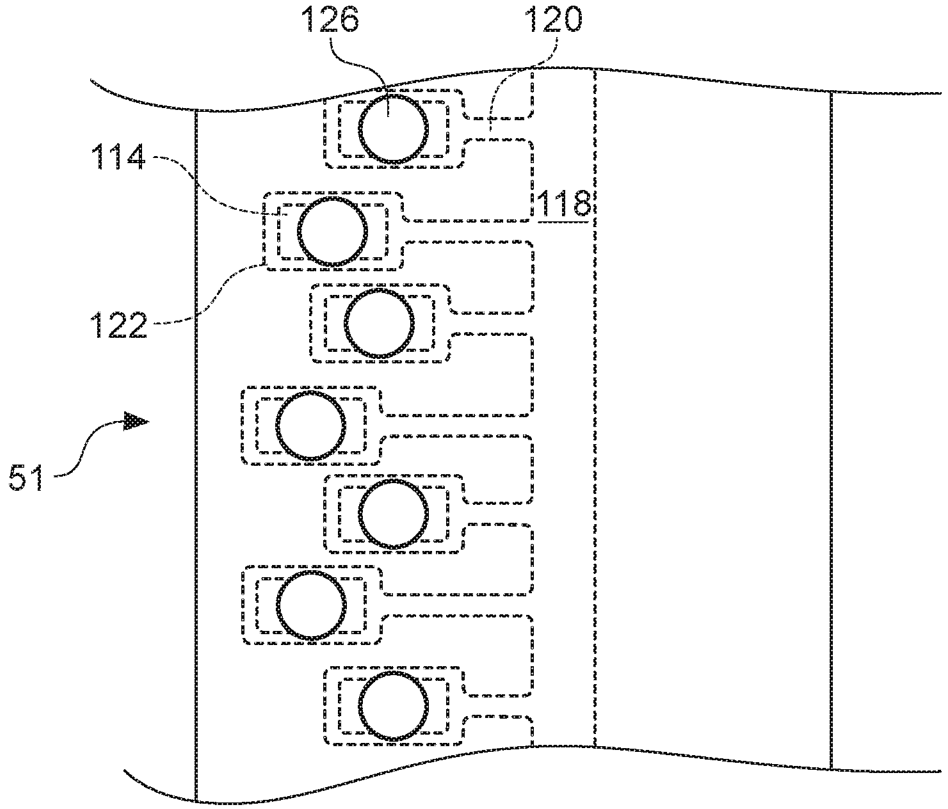
FIG. 5 is a plan view of a portion of a microfluidic die.

With reference to FIGS. 4 and 5, there is shown a simplified representation of a portion of a microfluidic die 51. The microfluidic die includes a semiconductor substrate 112 that may be a silicon semiconductor substrate 112 containing a plurality of fluid ejection actuators 114 such as piezoelectric devices or heater resistors formed on a device side 116 of the substrate 112 as shown in the simplified illustration of FIG. 5. In a microfluidic die having piezo actuators as the fluid ejection actuators 114, the piezo actuator may be disposed adjacent the nozzle such as shown in FIG. 5 or may be disposed away from the nozzles and still transmit the pressure pulse to the fluid composition to be ejected from the nozzles. Upon activation of fluid ejection actuators 114, fluid supplied through one or more fluid supply vias 118 in the semiconductor substrate 112 flows through a fluid supply channel 120 to a fluid chamber 122 in a thick film layer 124 where the fluid is caused to be ejected through nozzles 126 in a nozzle plate 128. Fluid ejection actuators are formed on the device side 116 of the semiconductor substrate 112 by well-known semiconductor manufacturing techniques. Thick film layer 124 and nozzle plate 128 may be separate layers or may be one continuous layer.

The nozzle plate 128 may include about 4-200 nozzles 126, or about 6-120 nozzles, or about 8-64 nozzles. Each nozzle 126 may deliver about 0.5 to about 35 picoliters, or about 1 to about 20 picoliters, or about 2 to about 10 picoliters of a fluid composition per electrical firing pulse. Individual nozzles 126 may have a diameter of typically about 0.0024 inches (5-50 microns). The flow rate of fluid composition released from the microfluidic die 51 could be in the range of about 5 to about 70 mg/hour or any other suitable rate or range.

With reference to FIGS. 1 and 3, the microfluidic cartridge 10 comprises an electric circuit 52. The electric circuit 52 may be in the form of a flexible circuit, semi-flexible circuit having rigid and flexible portions, and rigid circuit boards. The electric circuit 52 may include a first end portion 54, a second end portion 56, and a central portion 58 separating the first and second end portions 54 and 56, respectively. The first end portion 54 of the electric circuit 52 may include electrical contacts 60 for connecting with the electrical contacts of the housing of a microfluidic delivery device. The second end portion 56 of the electric circuit 52 may be in electrical communication with the microfluidic die 51.

In the case of a flexible or semi-flexible electric circuit 52, the electric circuit 52 may be disposed on and span two faces of the microfluidic cartridge 10. For example, with reference to FIGS. 1 and 3, for illustrative purposes only, the first end portion 54 of the electric circuit 52 may be disposed on the first face 26 of the microfluidic cartridge 10, the second end portion 56 of the electric circuit 52 may be disposed on the second face 28 of the microfluidic cartridge 10, and the central portion 58 of the electric circuit 52 may span the first and second faces 26 and 28, respectively, of the microfluidic cartridge 10.

In the case of a rigid electric circuit 52, the electric circuit 52 may be disposed on a single face of the microfluidic cartridge 52 such that the microfluidic die 51 and the electrical contacts 60 are disposed on the same face.

Figure 6:
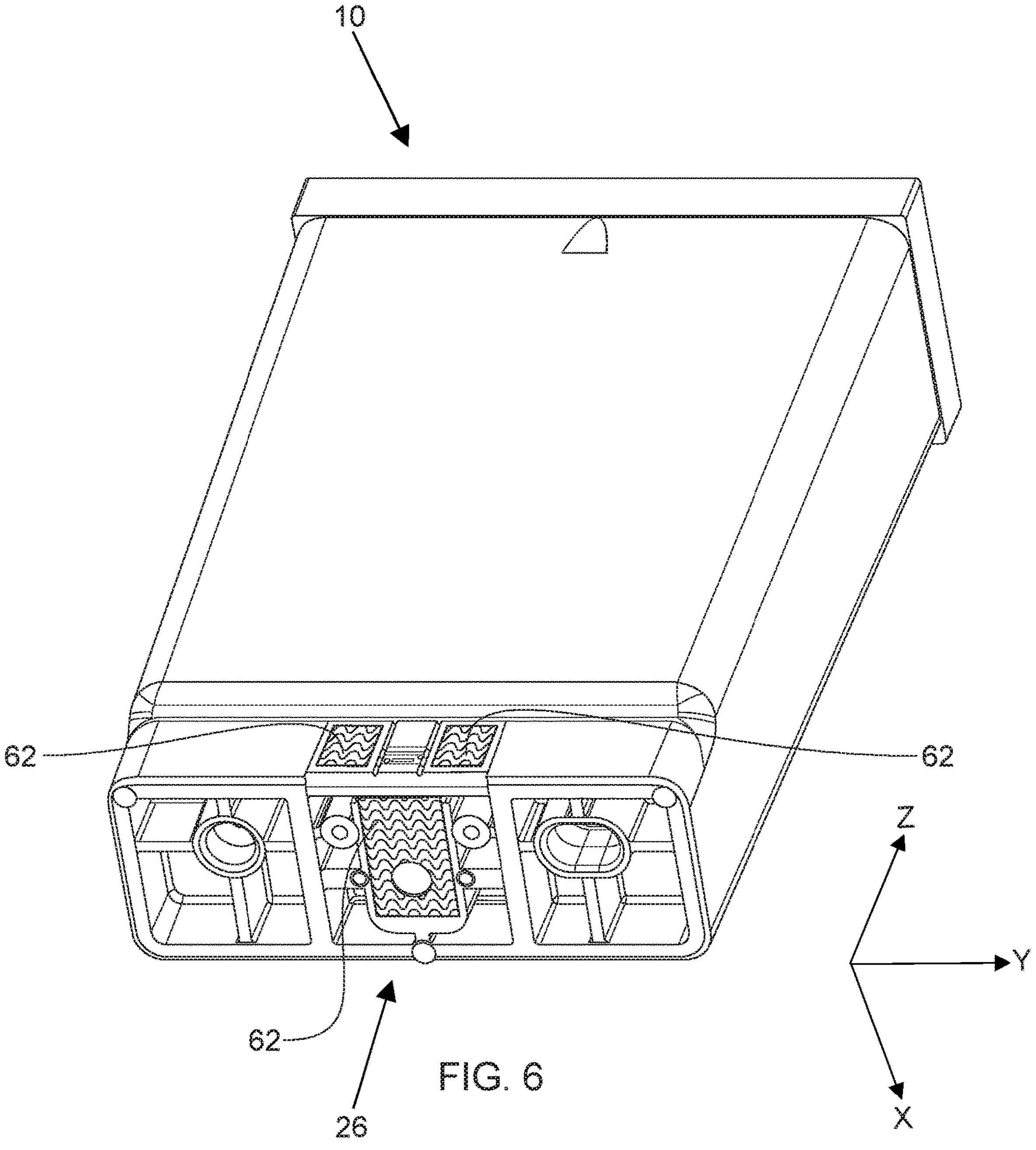
FIG. 6 is a perspective view of a microfluidic cartridge having adhesive for joining an electric circuit with the microfluidic cartridge.
Figure 7:
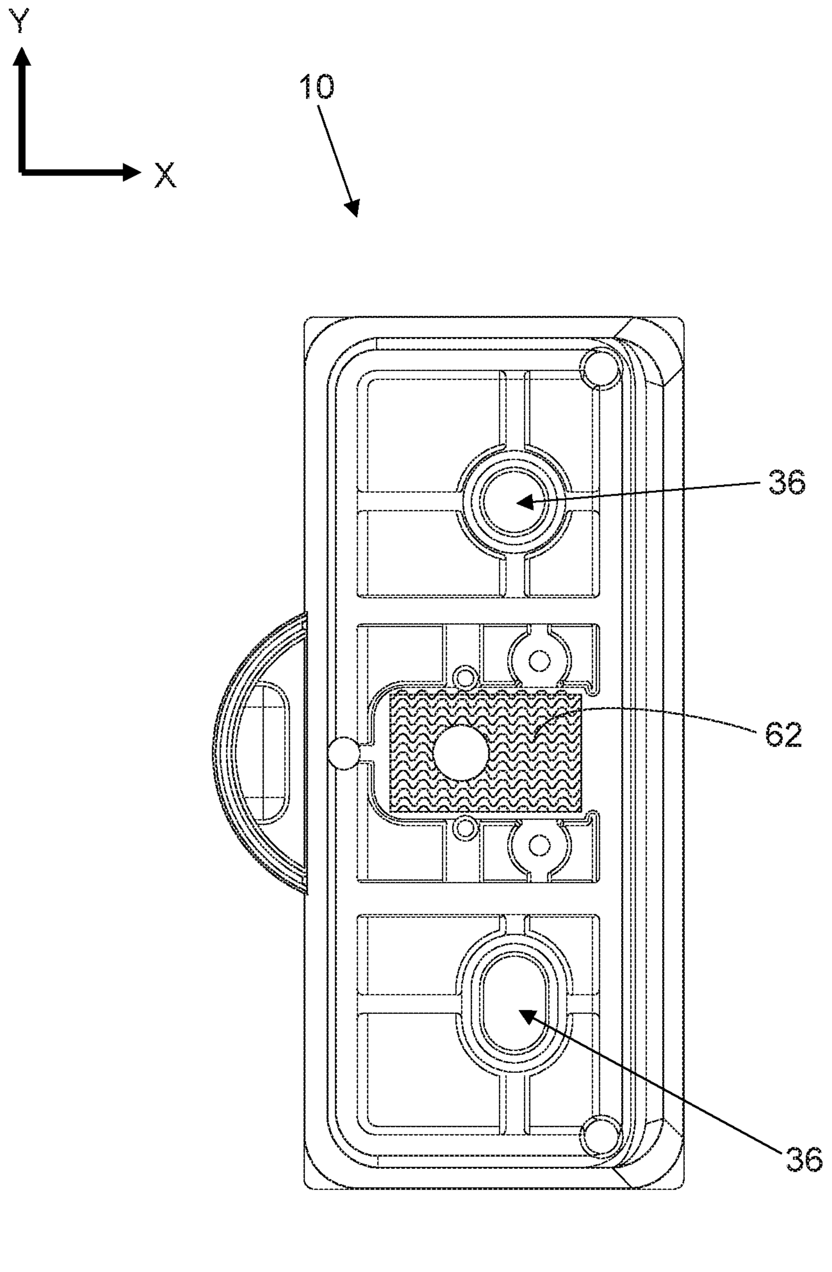
FIG. 7 is a bottom plan view of a microfluidic cartridge having adhesive for joining an electric circuit with the microfluidic cartridge.

With reference to FIGS. 3, 6, and 7, the electric circuit 52 may be joined with the exterior 14 of the microfluidic cartridge 10 using an adhesive 62. It has been found that certain adhesives can interact with the perfume mixture of the fluid composition being dispensed from the microfluidic die 51. In particular, some adhesives absorb the perfume mixture, causing the adhesives to swell and the electric circuit 52 and microfluidic die 51 to shift, resulting in physical and electrical instability of the electric circuit 52 and the microfluidic die 51. It has been found that silicone pressure-sensitive adhesives provide sufficient interfacial adhesion strength to secure the electric circuit 52 with the microfluidic cartridge 10 while also being chemically compatible with the perfume mixtures in the fluid compositions.

With reference to FIGS. 6-7, a microfluidic cartridge 10 may have a silicone pressure-sensitive adhesive 62 applied at positions where the electric circuit 52 is to be joined with the microfluidic cartridge 10.

Exemplary silicone pressure-sensitive adhesives include RT130GS silicone adhesive tape, available from Fastelmask.

With reference to FIG. 1, the microfluidic cartridge 10 may also comprise one or more cartridge connectors 36 to provide mechanical connection between the microfluidic cartridge 10 and the housing. A cartridge connector 36 on the microfluidic cartridge 10 may connect with or mate with a corresponding housing connector on the housing. For example, the cartridge connectors 36 may be configured as female connectors, such as openings that are configured to mate with one or more male connectors such as projections or guideposts, on the housing. Or, the cartridge connector 36 may be configured as a male connector may include one or more projections, such as guideposts, that are configured to mate with one or more female connectors such as openings on the housing. The mechanical connection between the microfluidic cartridge and the housing may help to properly align and secure the microfluidic cartridge in the housing to provide a robust electrical connection between the microfluidic cartridge and the housing.

Figure 8:
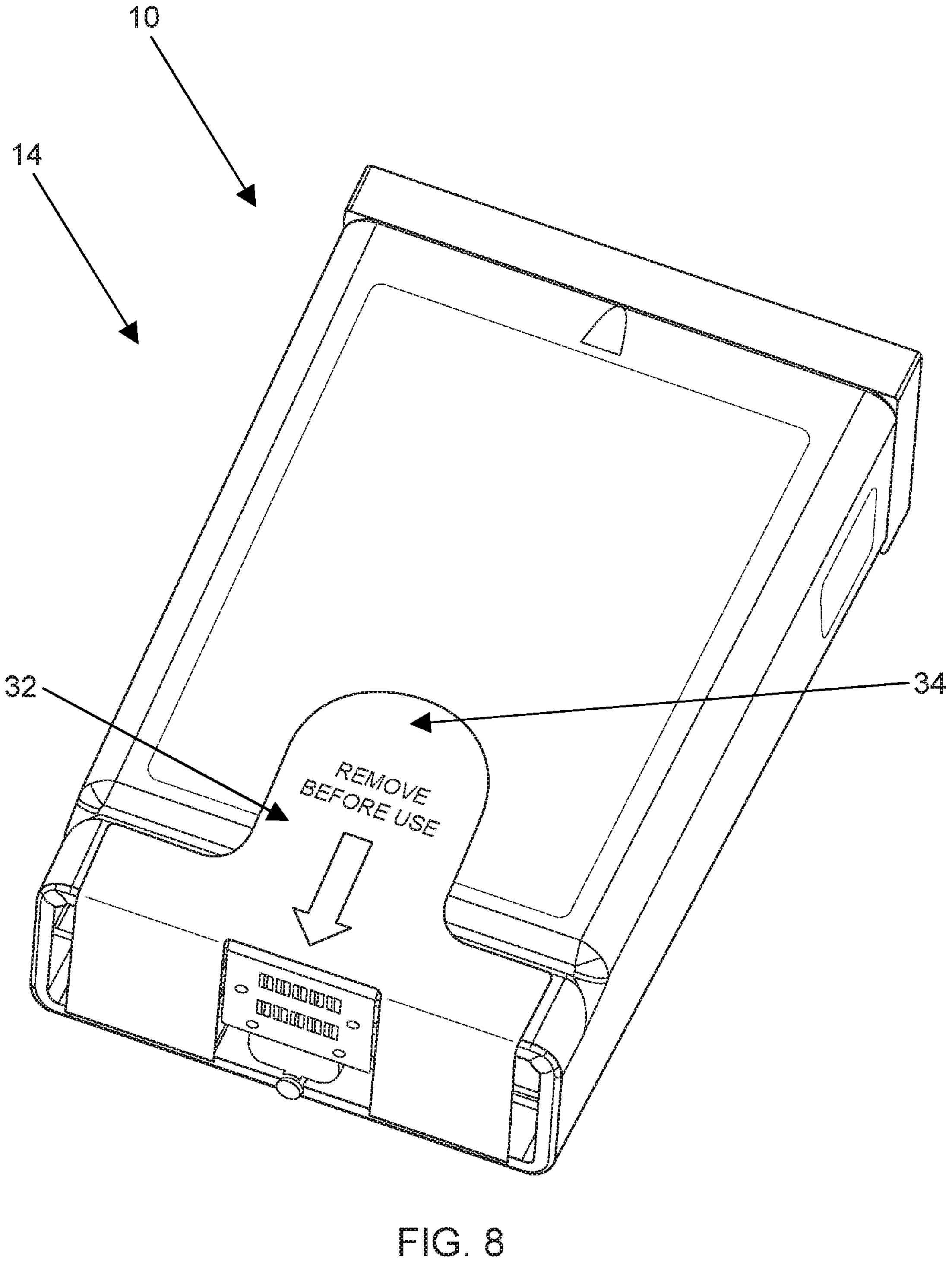
FIG. 8 is a perspective view of a microfluidic cartridge having a sticker that covers the microfluidic die.
Figure 9:
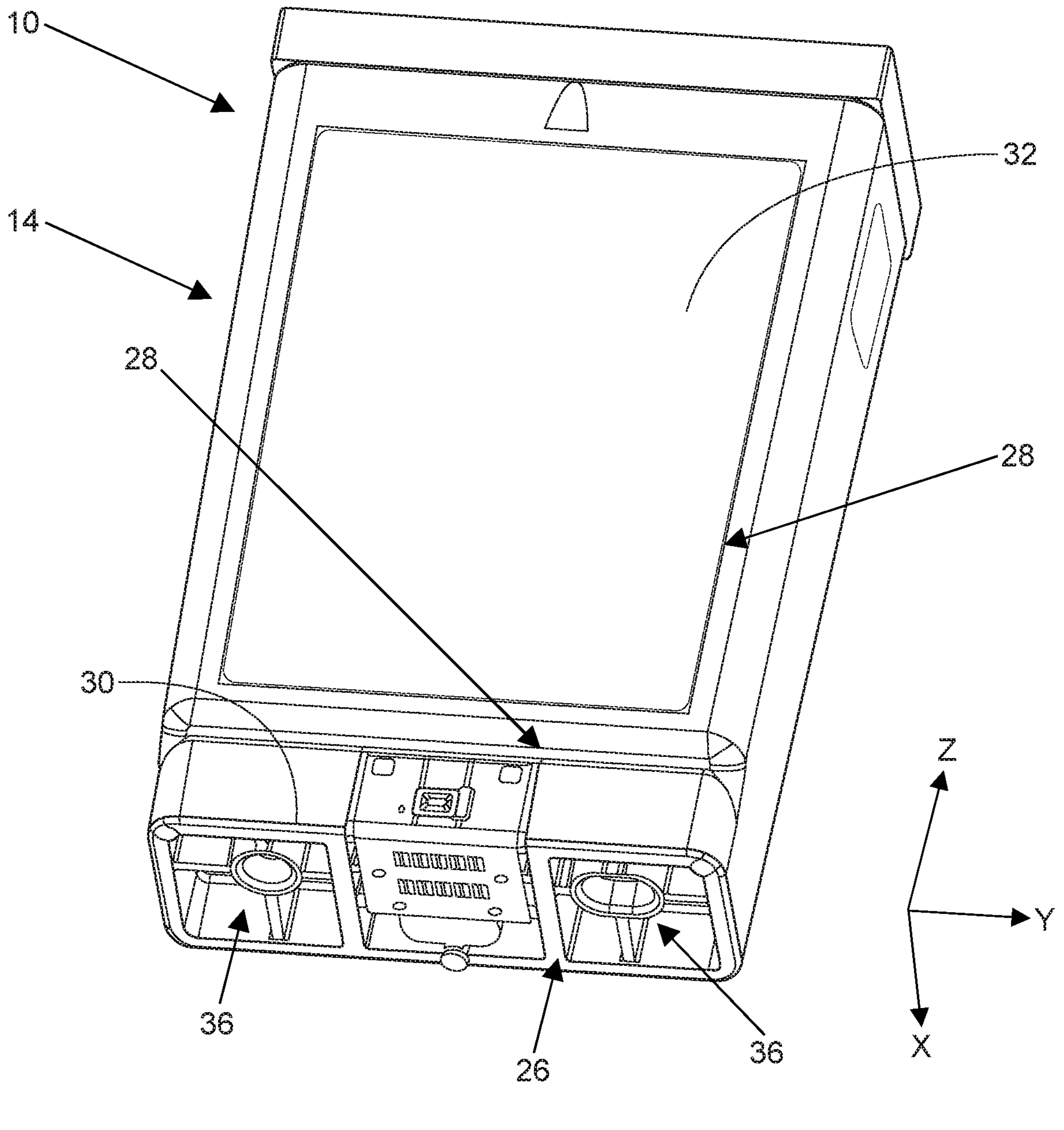
FIG. 9 is a perspective view of a microfluidic cartridge having a sticker.

With reference to FIGS. 8-9 and 14, the microfluidic cartridge may include one or more stickers 32. The stickers 32 may be used as a label to provide details of the perfume mixture, use instructions, or may be used for aesthetic benefits. The stickers 32 may also include the lid sticker 63.

As shown in FIG. 8, a microfluidic cartridge 10 may include a sticker 32 that covers the microfluidic die 51 and the one or more cartridge connectors 36 on the microfluidic cartridge 10. The sticker 32 may provide multiple benefits. The sticker 32 seals the microfluidic die 51 to prevent fluid composition from prematurely dispensing from the microfluidic cartridge before the microfluidic cartridge is installed in the housing. Additionally, the sticker 32 covers one or more of the cartridge connectors 36 to prevent a user from improperly installing the microfluidic cartridge with the housing before the sticker 32 is removed. In the event that a user forgets or does not realize that a sticker 32 on the microfluidic cartridge 10 needs to be removed before the microfluidic cartridge 10 is installed with the housing, the sticker will prevent the microfluidic cartridge from making mechanical connection with the housing. In the event that the user is unable to make mechanical connection between the microfluidic cartridge 10 and the housing, the user will then realize that they have incorrectly installed the microfluidic cartridge, and will notice upon further examination that the sticker is present and needs to be removed.

The sticker 32 may be sized and/or shaped in various ways in order to cover the microfluidic die and at least one cartridge connector.

The sticker 32 may be disposed on the first and second surfaces to cover at least the microfluidic die and at least the one or more cartridge connectors 36. The sticker may have various different shapes and sizes, so long as the microfluidic die and the at least one cartridge connector 36 are covered.

The sticker 32 covers the microfluidic die to ensure that the fluid composition remains sealed in the microfluidic cartridge 10 until the microfluidic cartridge is to be installed in the housing. The sticker also covers at least one of the cartridge connectors 36 to prevent the microfluidic cartridge from making electrical connection with the housing unless the sticker has been removed by the user.

The sticker 32 and/or lid sticker 63 may comprise a carrier material and an adhesive disposed on the side of the carrier material that will contact the microfluidic cartridge 10. The carrier material may be selected from a variety of materials, including plastic films such as polypropylene film, paper, cardboard, etc. The sticker 32 and lid sticker 63 may both be in contact with the fluid composition, and, thus, may both need to be designed to be chemically compatible with the fluid composition.

When a sticker is intended to be removed during normal use of the microfluidic cartridge 10, the adhesive may be selected to provide a high enough interfacial adhesion strength to remain securely joined with the microfluidic cartridge to seal the microfluidic die and to prevent fluid composition from prematurely leaking from the nozzles of the microfluidic die. However, in such stickers, the interfacial adhesion strength should not be too high so as to cause the cohesive bonds in the adhesive to break as the sticker is being removed from the microfluidic cartridge, which could cause some of the adhesive to leave a residue on the microfluidic die. The adhesive should also have a high enough cohesion strength such that the adhesive does not migrate into the nozzles of the microfluidic die. A relatively high cohesion strength may be attributed to a relatively high molecular weight and cross-linked density adhesive. Lower molecular weight and low cross-linked density result in a lower cohesion strength. The adhesive may be selected from a pressure-sensitive adhesive ("PSA"); hot melt films; B-stage epoxies; B-stage phenolics; thermoplastic bonding films; and combinations thereof. The adhesive may preferably be a silicone pressure-sensitive adhesive.

Like the adhesive used to join the electric circuit 52 with the microfluidic cartridge 10, it has also been found that the adhesive used for stickers 32 or portions of the stickers 32 that may come into contact with the fluid composition are also subject to chemical compatibility issues with perfume mixtures. As such, for stickers 32 that are intended to cover the microfluidic die 51 or stickers placed adjacent to the electric circuit 52 or the microfluidic die 51 where fluid composition may be present, the adhesive may preferably be a silicone pressure-sensitive adhesive.

As shown in FIGS. 8 and 14, combined or separate stickers 32 may be used for various purposes. FIG. 14 includes stickers 32*a* disposed on the reservoir 16 for aesthetic purposes or to convey instructions or provide information about the cartridge; sticker 32*b* disposed on the microfluidic die 51 for covering the nozzles before use; and a sticker 32*c* that covers the microfluidic die 51 and the one or more cartridge connectors 36 on the microfluidic cartridge 10. All of the stickers 32 shown in FIG. 14 may comprise a silicone pressure-sensitive adhesive for chemical compatibility.

Figure 10:
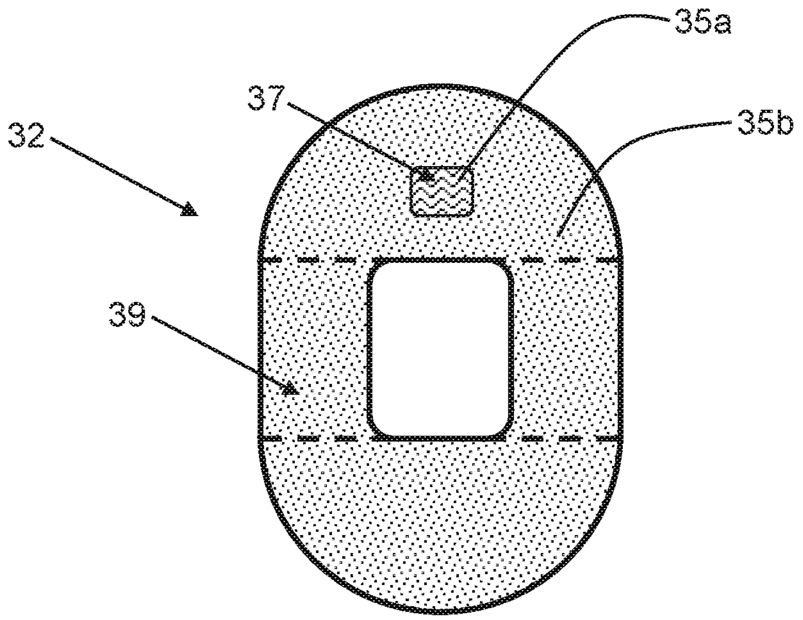
FIG. 10 is a plan view of a sticker for a microfluidic cartridge.

The sticker 32 may be comprised of one or more carrier materials and/or one or more adhesives. For example, with reference to FIG. 10, a first portion 37 of the sticker 32 that covers the microfluidic die 51 may include an adhesive with a relatively high cohesion strength to prevent the adhesive from leaving a residue on the microfluidic die after the sticker is removed. However, such an adhesive that has strong cohesion strength may not provide sufficient interfacial adhesion strength to maintain the sticker securely adhered to the microfluidic die during storage to prevent leaking of the fluid composition from the microfluidic die. As such, a second portion 39 of the sticker that at least partially surrounds the first portion 37 of the sticker 32 may be selected from adhesive materials with relatively strong interfacial adhesion strength. The first portion 37 of the sticker 32 may have a first adhesive 35*a* having a first interfacial adhesion strength and the second portion 39 of the sticker 32 may have a second adhesive 35*b* having a second interfacial adhesion strength, wherein the first interfacial adhesion strength is lower than the second interfacial adhesion strength.

The sticker 32 may have various different shapes, so long as the sticker covers the cartridge connectors and the microfluidic die of the microfluidic cartridge.

The sticker may be configured to not cover the electrical contacts of the electric circuit of the microfluidic cartridge. If the sticker contacted the electrical contacts, the sticker could leave behind adhesive that could negatively impact the electrical connections between the microfluidic cartridge and the housing.

The sticker may be designed in various ways to draw the user's attention to the sticker and the need to remove the sticker before inserting the microfluidic cartridge into the housing. Aspects of the sticker that may be designed to draw attention to the user include the shape, size, color(s), words, graphics, symbols, tabs, the like, and combinations thereof.

The sticker 32 may have a tab 34 that the user is able to grasp and pull to remove the sticker 32. The tab 34 may be free of adhesive. The tab 34 may be an extension of the carrier material that is free of adhesive. Or the tab 34 may be a separate portion that is connected with the carrier material comprising adhesive.

Microfluidic Delivery Device

Figure 11:
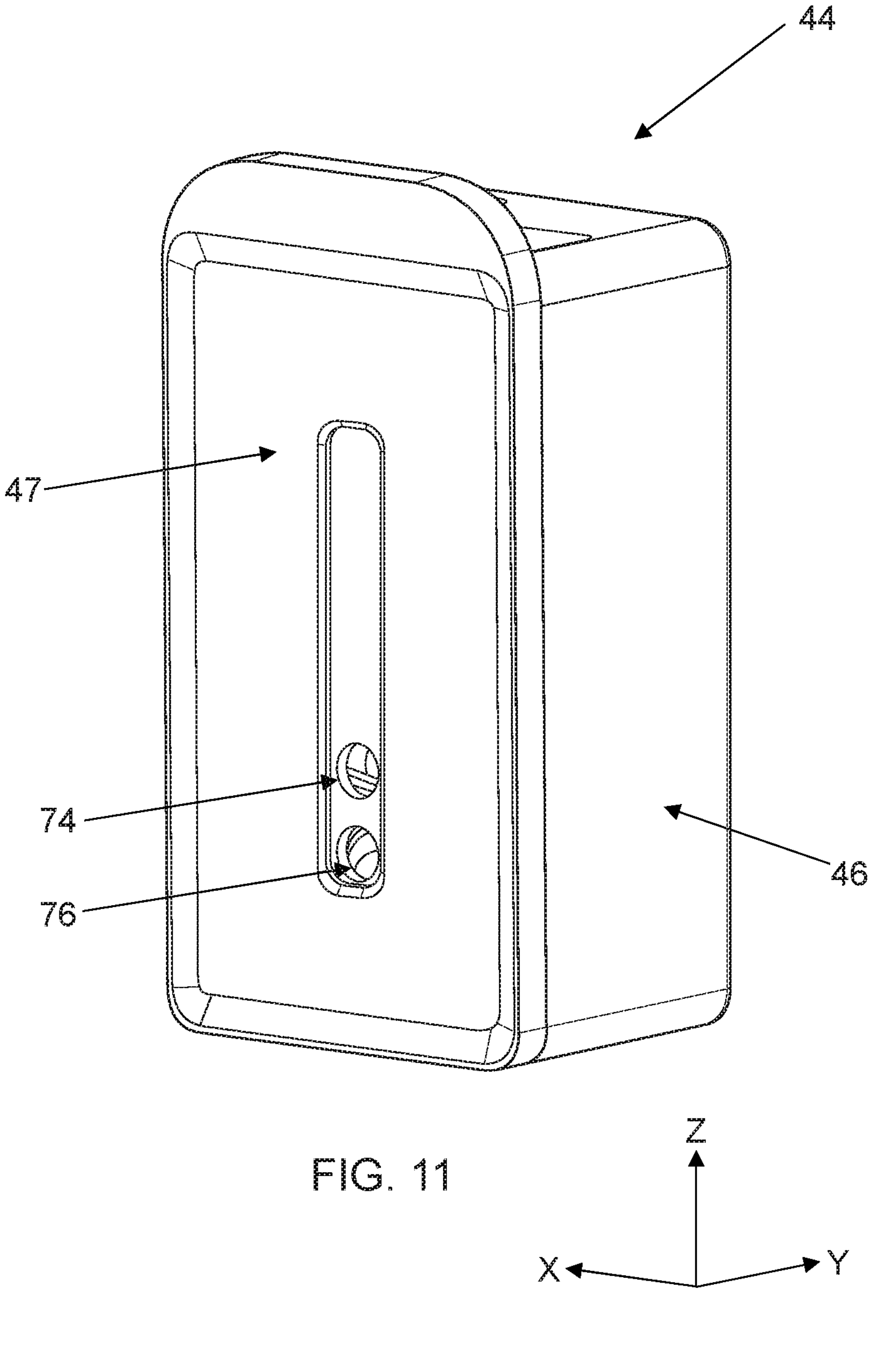
FIG. 11 is a perspective view of the front of a microfluidic delivery device.
Figure 12:
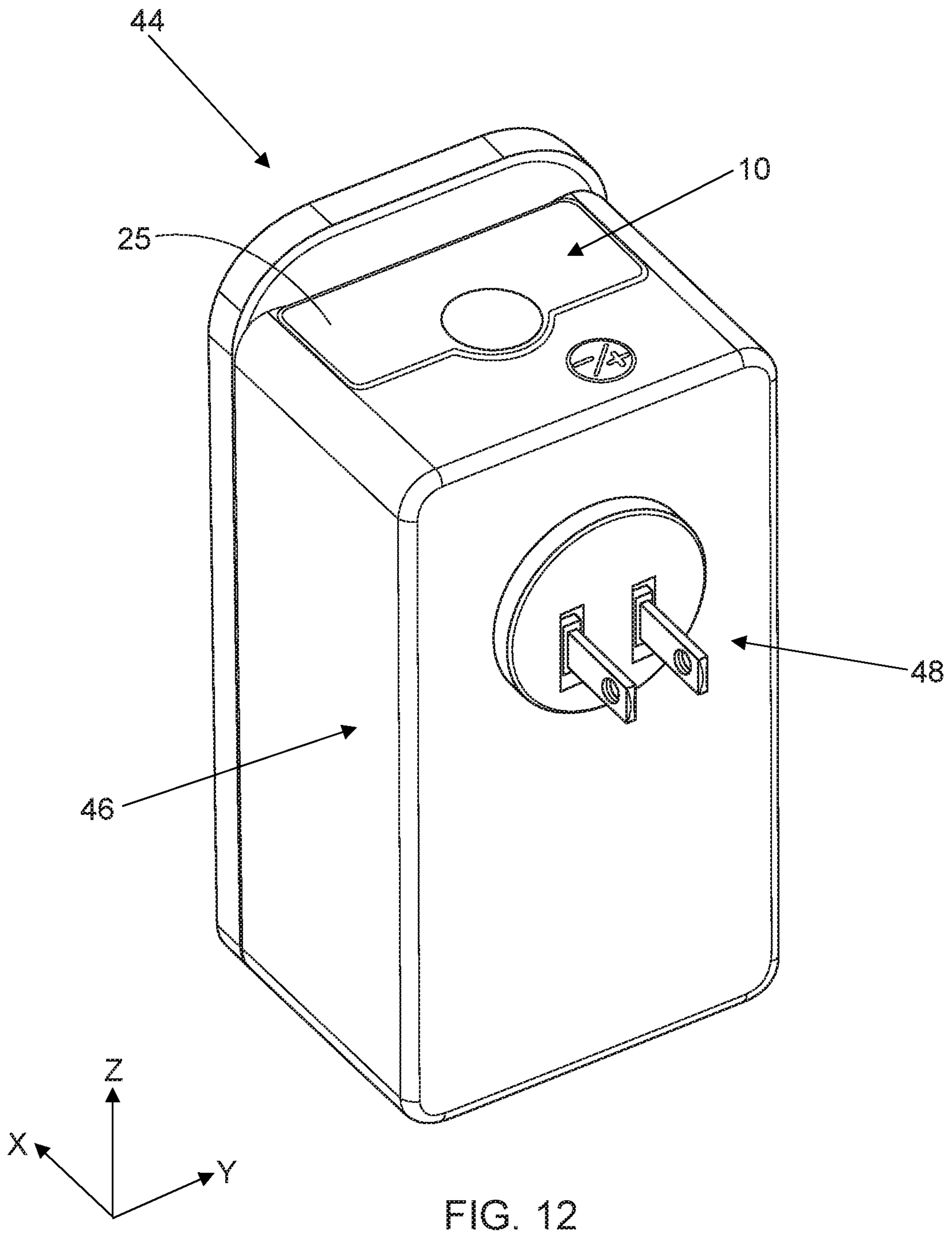
FIG. 12 is a perspective view of the back of a microfluidic delivery device.
Figure 13:
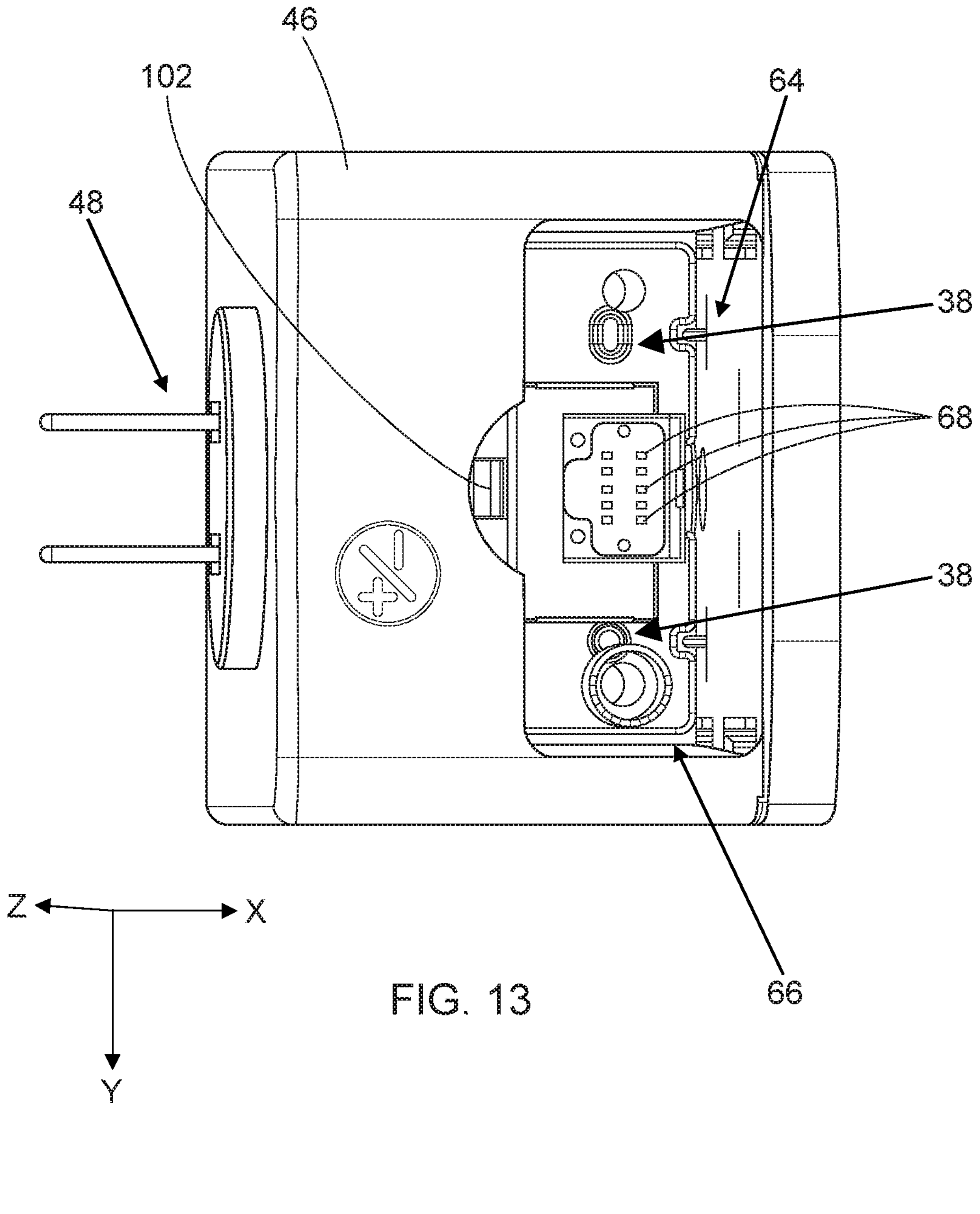
FIG. 13 is a top, plan view of a microfluidic delivery device.

With reference to FIGS. 11-13, a microfluidic cartridge 10 may be configured to be releasably connectable with a housing 46 of a microfluidic delivery device 44. The housing 46 may be connected with a power source 48. The housing 46 may include a receptacle 64 having an opening 66 for receiving the microfluidic cartridge 10. The receptacle 64 may receive a portion of the microfluidic cartridge 10 or the microfluidic cartridge 10 may be completely disposed within the receptacle 64. The receptacle 64 of the housing 46 may include electrical contacts 68 that are configured to electrically connect with the electrical contacts 60 of the microfluidic cartridge 10.

The receptacle 64 may include one or more housing connectors 38 configured to be received by the one or more cartridge connectors 36 of the microfluidic cartridge 10. The housing connectors 38 may be in the form of male connectors or female connectors. For example, if the cartridge connectors 36 are configured as female connectors, the housing connectors 38 may be configured as male connectors, or vice versa. The housing connectors 38 and cartridge connectors 36 may be sized and shaped to mate with each other for a sufficient mechanical and electrical connection to occur.

The housing 46 may include a faceplate 47 disposed on a front side of the housing 46. The housing 46 may also include a fluid outlet 74 for releasing the fluid composition from the microfluidic cartridge 10 into the air. The housing 46 may include an air outlet 76 for directing air toward the dispensed fluid composition upward and/or outward into the surrounding space. The fluid outlet 74 and the air outlet 76 may be disposed in the faceplate 47.

With reference to FIGS. 1 and 13, the cartridge connectors 36 and the housing connectors 38 may be used to align, secure, and limit movement of the microfluidic cartridge 10 relative to the housing of a microfluidic delivery device 44 to establish a strong electrical connection between the microfluidic cartridge 10 and the housing. The cartridge connectors 36 and the housing connectors 38 may be designed to provide either macro or micro alignment of the microfluidic cartridge 10. Mating the cartridge connectors 36 with the housing connectors 38 may prevent movement of the microfluidic cartridge 10 relative to the housing 46 of the microfluidic delivery device 44 in the X and Y-directions.

With reference to FIG. 13, the microfluidic cartridge 10 may be spring-loaded with the housing 46 in order to provide a robust electrical connection between the microfluidic cartridge 10. The microfluidic cartridge 10 may have a release button to release the microfluidic cartridge 10 from the housing 46. Or, the microfluidic cartridge 10 may be pushed toward the housing 46 to engage and/or disengage the microfluidic cartridge 10 from the housing 46. The microfluidic cartridge 10 may engage with a fastener 102 or clip to connect the microfluidic cartridge 10 into the housing 46.

The receptacle 64 may include one or more guiderails for directing the microfluidic cartridge 10 into the receptacle 64.

The microfluidic delivery device may be configured to be compact and easily portable. In such case, the microfluidic delivery device may be battery operated. The microfluidic delivery device may be capable for use with electrical sources as 9-volt batteries, conventional dry cells such as "A", "AA", "AAA", "C", and "D" cells, button cells, watch batteries, solar cells, as well as rechargeable batteries with recharging base.

The microfluidic delivery device may include a fan for generating air flow to assist with delivering the fluid composition into the air. Any fan may be used that provides the desired air flow velocity, size, and power requirements for the microfluidic delivery device. The fan may be used to push the fluid composition further into the air and/or may be used to direct the fluid composition in a different direction than the fluid composition is dispensed from the microfluidic die. The fan may be disposed in the interior of the housing or at least partially in the interior of the housing, or at the exterior of the housing. The fan may also be used to direct air over the microfluidic die 51 to minimize the amount of fluid composition that is deposited back onto the microfluidic die 51.

Fluid Composition

To operate satisfactorily in a microfluidic delivery device, many characteristics of a fluid composition are taken into consideration. Some factors include formulating fluid compositions with viscosities that are optimal to emit from the microfluidic delivery member, formulating fluid compositions with limited amounts or no suspended solids that would clog the microfluidic delivery member, formulating fluid compositions to be sufficiently stable to not dry and clog the microfluidic delivery member, formulating fluid compositions that are not flammable, etc. For adequate dispensing from a microfluidic die, proper atomization and effective delivery of an air freshening or malodor reducing composition may be considered in designing a fluid composition.

The fluid composition may comprise a perfume mixture comprising one or more perfume raw materials. Perfume raw materials deliver a hedonic, fragrance benefit. The fluid composition may contain a perfume mixture present in an amount greater than about 50%, by weight of the fluid composition, alternatively greater than about 60%, alternatively greater than about 70%, alternatively greater than about 75%, alternatively greater than about 80%, alternatively from about 50% to about 100%, alternatively from about 60% to about 100%, alternatively from about 70% to about 100%, alternatively from about 80% to about 100%, alternatively from about 90% to about 100%. The fluid composition may consist entirely of the perfume mixture (i.e. 100 wt. %).

The fluid composition may be substantially free of suspended solids or solid particles existing in a mixture wherein particulate matter is dispersed within a liquid matrix. The fluid composition may have less than 5 wt. % of suspended solids, alternatively less than 4 wt. % of suspended solids, alternatively less than 3 wt. % of suspends, alternatively less than 2 wt. % of suspended solids, alternatively less than 1 wt. % of suspended solids, alternatively less than 0.5 wt. % of suspended solids, or free of suspended solids. Suspended solids are distinguishable from dissolved solids that are characteristic of some perfume materials.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A microfluidic cartridge comprising:

an interior;

an exterior;

a reservoir disposed in the interior of the microfluidic cartridge, the reservoir comprising a fluid composition comprising a perfume mixture;

an electric circuit disposed on the exterior of the microfluidic cartridge, the electric circuit comprising a first end portion having electrical contacts and a second end portion opposing the first end portion;

a microfluidic die disposed on the exterior of the microfluidic cartridge, wherein the microfluidic die is electrically connected with the second end portion of the electric circuit and in fluid communication with the reservoir; and a silicone pressure-sensitive adhesive joining the electric circuit with the exterior of the microfluidic cartridge, wherein the silicone pressure-sensitive adhesive provides sufficient interfacial adhesion strength to secure the electric circuit with the microfluidic cartridge.

2. The microfluidic cartridge of claim 1, wherein the first end portion of the electric circuit is disposed on a first face of the exterior and the second end portion of the electric circuit is disposed on a second face of the exterior, and wherein the microfluidic die is disposed on the second face.

3. The microfluidic cartridge of claim 2 further comprising a sticker, wherein the sticker comprises a silicone pressure-sensitive adhesive.

4. The microfluidic cartridge of claim 3, wherein the sticker covers the microfluidic die.

5. The microfluidic cartridge of claim 1, wherein the microfluidic die comprises a semiconductor substrate comprising a plurality of thermal resistors, a fluid flow substrate comprising a fluid supply channel and one or more fluid chambers, wherein each fluid chamber is associated with one of the plurality of thermal resistors, and a nozzle plate comprising one or more nozzles, wherein each nozzle is in fluid communication with a fluid chamber.

6. The microfluidic cartridge of claim 1, wherein the fluid composition comprises at least 70 wt. % of a perfume mixture, based on the total weight of the fluid composition.

7. A microfluidic cartridge comprising:

an interior;

an exterior;

a reservoir disposed in the interior of the microfluidic cartridge, the reservoir comprising a fluid composition comprising a perfume mixture;

a lid enclosing the reservoir;

a lid sticker disposed on the exterior surface of the lid, the lid sticker comprising a silicone pressure-sensitive adhesive;

an electric circuit disposed on the exterior of the microfluidic cartridge, the electric circuit comprises a first end portion having electrical contacts and a second end portion opposing the first end portion; and a microfluidic die disposed on the exterior of the microfluidic cartridge, wherein the microfluidic die is electrically connected with the second end portion of the electric circuit and in fluid communication with the reservoir, wherein:

the silicone pressure-sensitive adhesive provides sufficient interfacial adhesion strength to secure the electric circuit with the microfluidic cartridge.

8. The microfluidic cartridge of claim 7, wherein the first end portion of the electric circuit is disposed on a first face of the exterior and the second end portion of the electric circuit is disposed on a second face of the exterior, and wherein the microfluidic die is disposed on the second face.

9. The microfluidic cartridge of claim 7, wherein the lid sticker covers the microfluidic die.

10. The microfluidic cartridge of claim 7, wherein the microfluidic die comprises a semiconductor substrate comprising a plurality of thermal resistors, a fluid flow substrate comprising a fluid supply channel and one or more fluid chambers, wherein each fluid chamber is associated with one of the plurality of thermal resistors, and a nozzle plate comprising one or more nozzles, wherein each nozzle is in fluid communication with a fluid chamber.

11. The microfluidic cartridge of claim 7, wherein the fluid composition comprises at least 70 wt. % of a perfume mixture, based on the total weight of the fluid composition.

* * * * *